INVENTOR.
J.S. NIELSEN
BY
ATTORNEY

United States Patent Office 2,905,064
Patented Sept. 22, 1959

2,905,064

METHODS AND APPARATUS FOR MACHINING AND FOR HOLDING DURING MACHINING HONEYCOMB MATERIAL

James S. Nielsen, Wadsworth, Ohio, assignor to Goodyear Aircraft Corporation, Akron, Ohio, a corporation of Delaware Application August 12, 1957, Serial No. 677,732

7 Claims. (Cl. 90—59)

This invention relates to methods for machining fragile materials and to apparatus for holding such materials during machining.

In the fabrication of high strength, low weight structural materials for use in the aircraft and other industries various high strength and low density core materials are now available which are positioned as a core or filler between surface sheets of high strength but relatively thin gauge to provide panel or sandwich-like constructions. A typical core material has been made from a plurality of relatively thin sheets of aluminum, duralumin or even glass fabric reinforced with resin, the plurality of sheets being connected together at spaced but alternating line-like areas and then expanded to provide a cellular, honeycomb-like material in which the cells of the material normally extend vertically of the surface sheets adhesively secured to the core material to form the panel-like structure. It sometimes becomes advisable to form panels of curved coutour, or of varying thickness, and because the flat panels incorporating honeycomb material cannot normally be bent or formed after the panel has been assembled without destruction or collapse of the honeycomb core material, it has been found advantageous or even necessary to machine the honeycomb material prior to assembling it as a core into a panel construction. However, because of the relatively light weight and thin walls of the honeycomb material, and the considerable dimensions both as to length and width of the honeycomb material required to form a panel, the support of the honeycomb material during a machining operation becomes exceedingly difficult.

It is the general object of the invention to provide improved, rapid, relatively inexpensive methods and apparatus for machining and for releasably holding fragile materials, and particularly thin metal or like honeycombs, to facilitate machining.

Another object of the invention is the provision of apparatus utilizing refrigeration means for releasably chucking honeycomb-like material during machining operations.

Another object of the invention is the provision of a machining method for relatively thin-walled honeycomb materials, or the like, in which the walls of the material are supported by a frozen liquid, such as water, during the machining, with the walls of material and of the frozen liquid being simultaneously machined.

Other objects of the invention include mechanism for applying hot fluid to the chucking means to quickly melt the frozen liquid to effect the release of the material to be machined, the use of flexible bristles mounted in upstanding relation in association with the chucking plate to thereby better hold the material during the chucking operations, to improved drain means for collecting the melted liquid upon the release of the chucking operation, and to spray means to facilitate the application of coatings of the liquid to be frozen during the chucking operation.

The foregoing objects of the invention, and other objects which will become apparent as the description proceeds, are achieved by the provision of apparatus including a plate adapted to engage with and support one side of the honeycomb material with the cells of the honeycomb extending substantially perpendicular to the plate, means for spraying a freezable liquid onto the honeycomb material, chamber means internally of the plate, refrigeration means connected to the chamber means, and means for cutting off the refrigeration means from the chamber means. Usually a second chamber is associated with the plate, and means are provided for supplying heating fluid to the second chamber, and drainage means are provided in the plate for collecting and directing the melted frozen liquid to a drain. Incorporated with the plate may be a plurality of upstanding bristles which extend into the honeycomb to assist in holding it on the plate by means of the frozen liquid.

In accord with the method of the invention the honeycomb is mounted upon the support plate and is chilled to a temperature to substantially instantaneously or to quickly freeze a mist or spray of water directed against it, a mist or spray of water is then directed against the honeycomb to apply a coating of ice over the honeycomb material and to secure it to the support, this is continued to apply the water until an ice coating of sufficient strength has been built up to support the walls of the honeycomb material during machining, followed by machining the ice and honeycomb to the desired shape, melting the ice, and removing the honeycomb from the support.

For a better understanding of the invention reference should be had to the accompanying drawings wherein.

Figure 1:
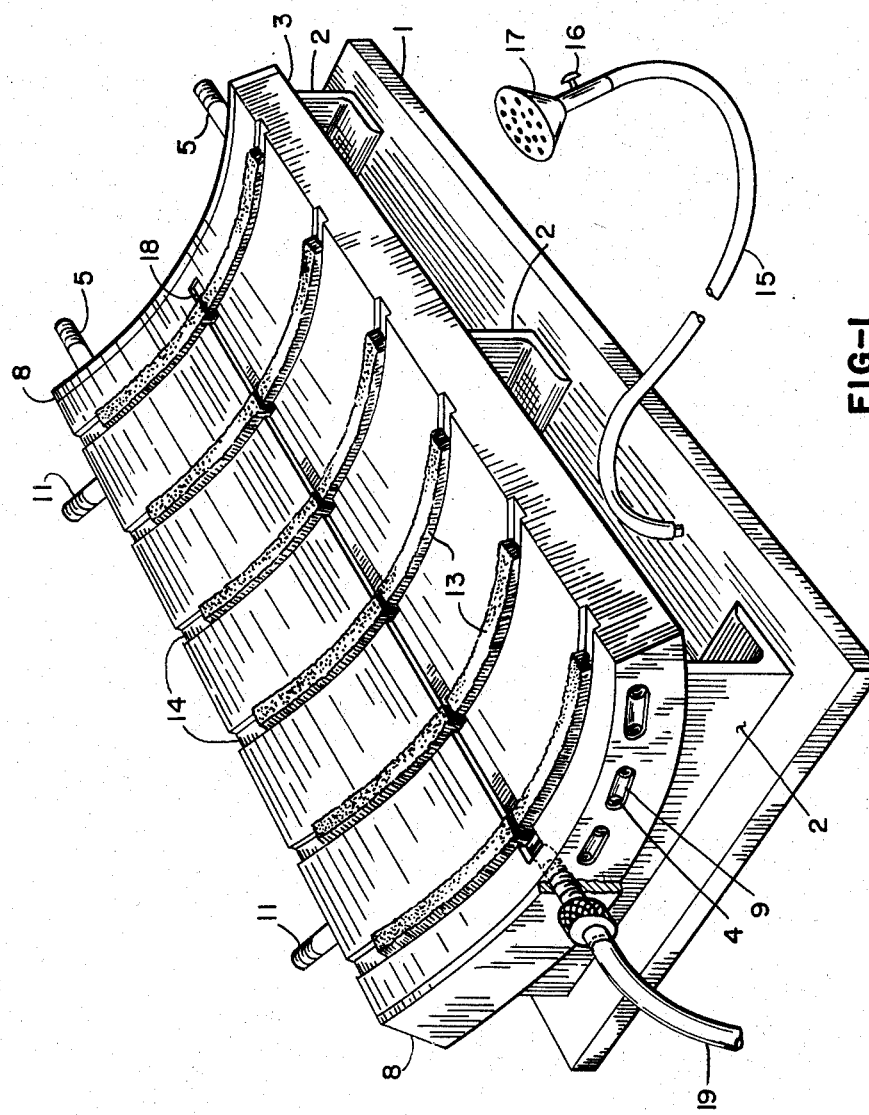
Fig. 1 is a perspective view of one form of apparatus incorporating the principles of the invention.

In the drawings, the numeral 1 indicates a base adapted to be clamped to the bed of a machine tool, such as a planer, shaper, milling machine or the like, with the base 1 supporting, for example by angles 2, a plate 3 having the desired contour. The plate 3 can be curved, in the manner illustrated, or can be flat, or shaped as desired to best support the honeycomb material during the subsequent machining operation.

Figure 3:
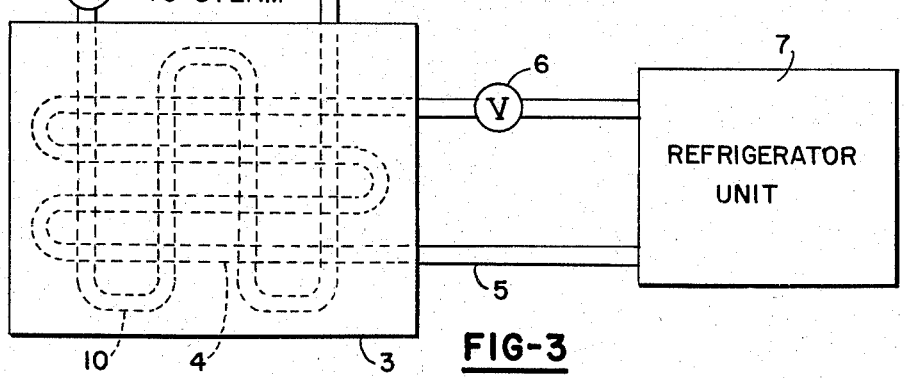
Fig. 3 is a plan view in diagrammatic form, and on a reduced scale, of the apparatus of Fig. 1.

The uppermost portion of plate 3 can be appropriately drilled, or otherwise provided with a series of openings 4 which are connected to each other in a manner to provide a continuous passage through the top portion of the plate for a refrigerant, conduits 5 being connected to the ends of the passages 4, the conduits 5 extending through a valve 6 (see Fig. 3) to a refrigeration unit 7. The arrangement is such that when the valve 6 is opened refrigerant will be supplied through passage 4 to refrigerate the plate 3 to a temperature to freeze water or other liquid utilized in the releasable chucking operation.

The formation of the passages 4 in the plate 3 is facilitated by the use of end plates 8 secured in sealing relation at the ends of plate 3 and covering the drilled passages 4 which are alternately connected at opposite ends of the plate 3 by milled slots 9 to provide the continuous passage for the refrigerant.

Additionally, the bottom portion of the plate 3 is appropriately formed with a continuous passage 10 terminating in conduits 11 one of which includes a valve 12 whereby steam or some other heated fluid can be supplied to the plate 3 to expedite the melting of the frozen liquid and the release of the honeycomb material from the chucking operation.

Figure 2:
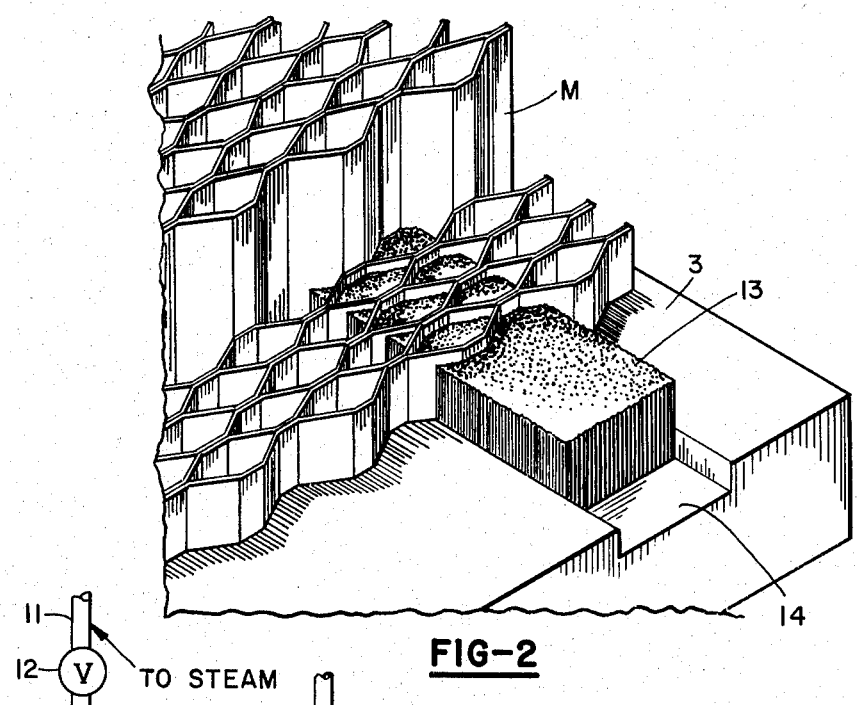
Fig. 2 is an enlarged fragmentary perspective view of a portion of the apparatus of Fig. 1, and illustrating the manner of positioning honeycomb material thereon.

Looking now at Figs. 1 and 2, the plate 3 may be provided with a plurality of upstanding flexible bristles 13 which may be conveniently arranged in rows extending laterally of the plate 3 in the manner illustrated, and fixed in grooves 14. Then when honeycomb material, marked M, is placed down on the plate 3 the upstanding bristles 13 extend upwardly into the honeycomb material in the manner shown in Fig. 2 to enhance the support of and the gripping of the honeycomb material. In Fig. 2 portions of the honeycomb material are broken away to better illustrate the action just described, but it will be understood that honeycomb material of various thicknesses can be chucked, for example, from as little as ¼ of an inch in vertical height to as much as several inches.

Associated with the platform 1 is a conduit 15 connected to a suitable source of supply of water or other liquid to be frozen, the conduit 15 being flexible and connected through a plunger-type valve 16 to a spray head 17. Once the honeycomb material M is placed down on the plate 3 and the refrigerating action on the plate is started by opening the refrigeration valve 6 the operator will direct spray head 17 towards the honeycomb material and press valve 16 to direct a spray or mist of water or other liquid to be frozen against the honeycomb material M on the plate 3.

The plate 3 is also provided with suitable drainage means which may take the form of a longitudinally directed groove 18 along the center of the plate and connecting all of the grooves 14 with a drainage conduit 19, the end of the groove 18 remote from the conduit 19 being closed to insure the flow of drainage liquid to the conduit 19.

Figure 4:
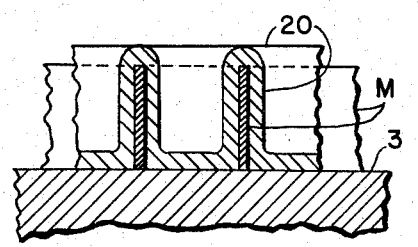
Fig. 4 is an enlarged, fragmentary, cross-sectional view illustrating one manner of supporting the honeycomb material with a layer of ice prior to and during a machining operation.

Fig. 4 illustrates one manner or securing the honeycomb material M to the plate 3 by a frozen liquid, indicated by the numeral 20. In this form of practicing the invention it will be seen that the frozen liquid 20 has merely formed a layer or covering over the material M and along the bottom openings of the honeycomb material adjacent the plate 3, this being achieved by cooling the honeycomb material M adequately with the plate 3 prior to directing a mist-like spray against the material M with the spray head 17. For certain types of machining operations the layer-type support of frozen liquid as shown in Fig. 4 will adequately support the honeycomb material and secure it to the plate 3 during machining.

Figure 5:
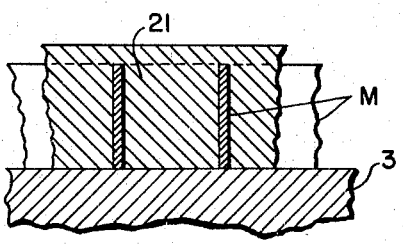
Fig. 5 is a view similar to Fig. 4 but showing still another manner of supporting the honeycomb material with ice prior to or during a machining operation.

In the embodiment of the invention shown in Fig. 5, the honeycomb material M is secured to the plate 3 by a solid block of frozen liquid 21 to thereby provide a more rigid support for the honeycomb material M during a machining operation and to likewise fasten the material M to the plate 3. The solid block of ice or other frozen liquid 21 is obtained by continuing the spraying operation over and above that provided in Fig. 4 and until such time as a complete block of ice is built up. It may also be possible in certain chucking operations, as when the plate 3 is flat to provide a rubber or other dam around the edge of the plate to a height somewhat greater than that of the honeycomb followed by the placement of water inside of the dam, followed by freezing of the water in the block form to secure the honeycomb material to the plate 3 and to support the material during the subsequent machining operation.

It is believed that the operation of the apparatus and the performance of the method of the invention will be understood from the foregoing description. Suffice it to say here that honeycomb material M or other frangible materials can be quickly secured to a support plate for a machining operation in the manner described, and after the machining operation has been completed the refrigeration valve 6 is closed, the heated fluid valve 12 is opened to quickly melt the frozen liquid supporting and holding the material M, followed by the drainage of the liquid to the conduit 19, whereupon the machined material M can be lifted off of the plate 3.

It is sometimes possible under high humidity conditions to dispense with the use of the application of a spray, mist or body of water to the honeycomb material. This is because the water vapor condenses out of the air against the cooled honeycomb material in sufficient quantity and with sufficient rapidity to effect at least the holding arrangement of Fig. 4.

Figure 6:
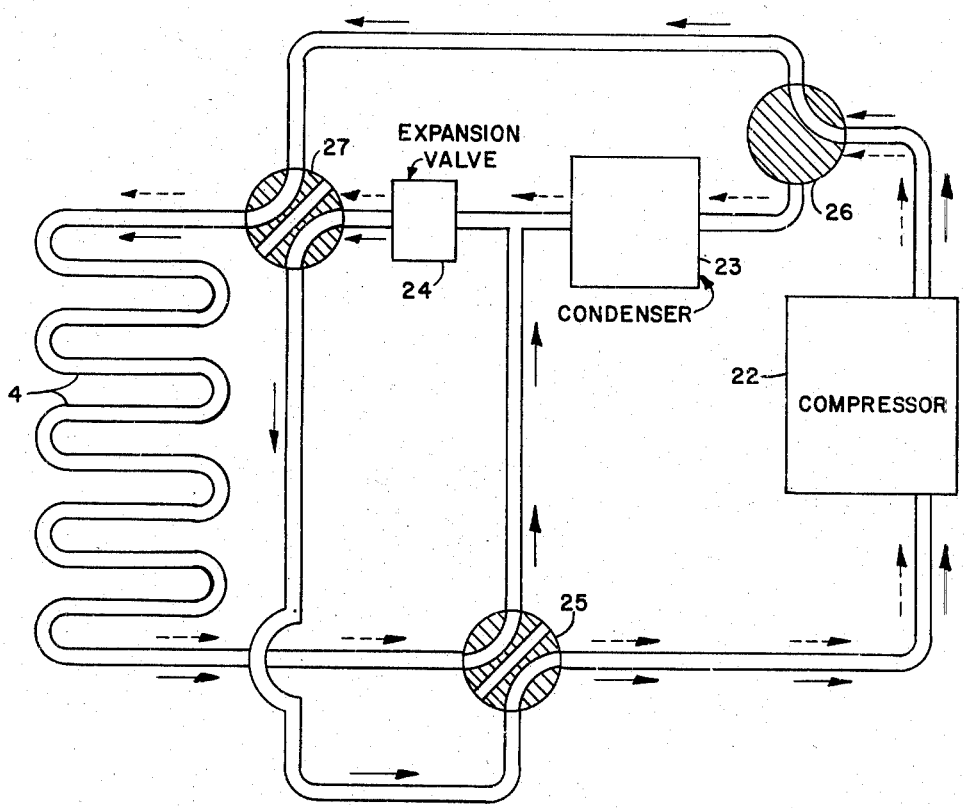
Fig. 6 is a diagrammatic view of a refrigeration system which can be employed both to freeze and to heat the support platen.

In Fig. 6 has been illustrated a modification of the invention wherein a single refrigerating system is utilized both to cool and to heat the support plate or platform. More particularly, in Fig. 6 is shown a compressor 22, a condenser 23, and an expansion valve 24 of a standard refrigerator system. These are connected by conduits as shown to passages 4 in plate 3. Connected in the system are valves 25, 26 and 27 which when positioned as shown connect the hot compressed gases for passage in the manner shown by the solid arrows through the passages 4 to unfreeze the plate 3. Turning the valves 25 and 27 clockwise 45° and valve 26 clockwise 90° will connect the system as shown by the dotted arrows to pass gases at freezing temperature through passages 4.

While in accord with the patent statutes certain specific embodiments of the invention have been illustrated and described in detail, it is to be particularly understood that the invention is not to be limited thereto or thereby, but that the scope of the invention is defined in the appended claims.

What is claimed is:

1. Apparatus for releasably holding a sheet of honeycomb structural material to facilitate machining, said apparatus including, a curved plate adapted to engage with and support one side of the honeycomb material with the cells of the honeycomb extending substantially perpendicular to the plate, a plurality of separated rows of flexible bristles embedded in the plate and extending above and perpendicular to the surface thereof so as to extend into the cells of the honeycomb material when the sheet thereof is supported on the plate, means for spraying a freezable liquid onto the honeycomb material, chamber means internally of the plate, refrigeration means connected to the chamber means to freeze a liquid applied to the honeycomb material so as to secure the material to the plate with the frozen liquid, means for cutting off the refrigeration means from the chamber means, a second chamber associated with the plate, means for supplying heating fluid to the second chamber, means for cutting off the means for supplying heating fluid to the second chamber, and drainage means in the plate for collecting and directing the melted frozen liquid to a drain.

2. Apparatus for releasably holding a sheet of honeycomb structural material to facilitate machining, said apparatus including, a plate adapted to engage with and support one side of the honeycomb material with the cells of the honeycomb extending substantially perpendicular to the plate, a plurality of separated rows of flexible bristles embedded in the plate and extending above and perpendicular to the surface thereof so as to extend into the cells of the honeycomb material when the sheet thereof is supported on the plate, means for spraying a freezable liquid onto the honeycomb material, chamber means associated with the plate, refrigeration means connected to the chamber means to freeze a liquid applied to the honeycomb material so as to secure the material to the plate with the frozen liquid, and means for cutting off the refrigeration means from the chamber means.

3. Apparatus for releasably holding a sheet of honeycomb structural material to facilitate machining, said apparatus including, a plate adapted to engage with and support one side of the honeycomb material with the cells of the honeycomb extending substantially perpendicular to the plate, a plurality of separated rows of flexible bristles embedded in the plate and extending above and perpendicular to the surface thereof so as to extend into the cells of the honeycomb material when the sheet thereof is supported on the plate, chamber means associated with the plate, refrigeration means connected to the chamber means to freeze a liquid applied to the honeycomb material so as to secure the material to the plate with the frozen liquid, and means for cutting off the refrigeration means from the chamber means.

4. Apparatus for releasably holding a sheet of honeycomb structural material to facilitate machining, said apparatus including, a plate adapted to engage with and support one side of the honeycomb material with the cells of the honeycomb extending substantially perpendicular to the plate, anchoring means projecting from the plate to engage in cells of the material, means for spraying a freezable liquid onto the honeycomb material and said anchoring means, chamber means internally of the plate, refrigeration means connected to the chamber means to freeze a liquid applied to the honeycomb material so as to secure the material to the plate with the frozen liquid means, for cutting off the refrigeration means from the chamber means, a second chamber associated with the plate, means for supplying heating fluid to the second chamber, means for cutting off the means for supplying heating fluid to the second chamber, and drainage means in the plate for collecting and directing the melted frozen liquid to a drain.

5. Apparatus for releasably holding a sheet of honeycomb structural material to facilitate machining, said apparatus including, a plate adapted to engage with and support one side of the honeycomb material with the cells of the honeycomb extending substantially perpendicular to the plate, flexible means extending from the face of the plate for entering cells of the material, chamber means internally of the plate, refrigeration means connected to the chamber means to freeze a liquid applied to the honeycomb material and said flexible means so as to secure the material to the plate with the frozen liquid, means for cutting off the refrigeration means from the chamber means, a second chamber associated with the plate, means for supplying heating fluid to the second chamber, means for cutting off the means for supplying heating fluid to the second chamber, and drainage means in the plate for collecting and directing the melted frozen liquid to a drain.

6. Apparatus for releasably holding a sheet of honeycomb structural material or the like ot facilitate machining, said apparatus including a plate adapted to engage with and support one side of the honeycomb material, deflectable locating and anchoring means extending outwardly of the supporting face of said plate for engaging the material, chamber means associated with the plate, refrigeration means including a compressor, a condenser and an expansion valve, conduit means connecting the compressor to the condenser, the condenser to the expansion valve, the expansion valve to the chamber means, and the chamber means to the input side of the compressor to effect cooling of the plate and anchoring means, and valve means for disconnecting the chamber means from between the expansion valve and the compressor and for connecting the chamber means between the compressor and the condenser to effect heating of the plate.

7. Apparatus for releasably holding a sheet of honeycomb structural material or the like to facilitate machining, said apparatus including a plate adapted to engage with and support one side of the honeycomb material, bristle means mounted on the work-supporting face of the plate and projecting therefrom, chamber means associated with the plate and means for circulating cooling or heating fluid through the chamber means.

References Cited in the file of this patent
UNITED STATES PATENTS

| | | |
|---|---|---|
| 633,310 | Gaylord | Sept. 19, 1899 |
| 995,537 | Hertner | June 20, 1911 |
| 1,332,445 | Mershon | Mar. 2, 1920 |
| 2,081,639 | Perry et al. | May 25, 1937 |
| 2,629,230 | Turner | Feb. 24, 1953 |
| 2,641,879 | Dalrymple | June 16, 1953 |
| 2,819,654 | Coy | Jan. 14, 1958 |
| 2,826,125 | Dougherty | Mar. 11, 1958 |
| 2,855,664 | Griffith | Oct. 14, 1958 |

OTHER REFERENCES

Publication: Popular Science, vol. 169, issue 4, page 124, October 1956.